United States Patent
Leicht et al.

(10) Patent No.: US 10,264,593 B2
(45) Date of Patent: Apr. 16, 2019

(54) CHANNEL QUALITY REPORTING IN DEPENDENCY OF COMMUNICATION CONDITIONS

(71) Applicant: Telefonaktiebolaget LM Ericsson (publ), Stockholm (SE)

(72) Inventors: Hans Juergen Leicht, Unterleinleiter (DE); Holger Deierl, Hohenstadt (DE); Oliver Klein, Nuremberg (DE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/540,469

(22) PCT Filed: Dec. 30, 2014

(86) PCT No.: PCT/EP2014/079439
§ 371 (c)(1),
(2) Date: Jun. 28, 2017

(87) PCT Pub. No.: WO2016/107648
PCT Pub. Date: Jul. 7, 2016

(65) Prior Publication Data
US 2018/0007704 A1 Jan. 4, 2018

(51) Int. Cl.
*H04W 72/12* (2009.01)
(52) U.S. Cl.
CPC ... *H04W 72/1231* (2013.01); *H04W 72/1242* (2013.01); *H04W 72/1284* (2013.01)

(58) Field of Classification Search
CPC ......... H04W 72/1231; H04W 72/1242; H04W 72/1284
See application file for complete search history.

(56) References Cited

U.S. PATENT DOCUMENTS

| | | | |
|---|---|---|---|
| 2009/0215442 A1 | 8/2009 | Lindoff et al. | |
| 2009/0268616 A1 | 10/2009 | Hosomi | |
| 2010/0034127 A1* | 2/2010 | Iwamura | H04B 7/2637 370/311 |
| 2014/0098697 A1 | 4/2014 | Wang et al. | |
| 2016/0337023 A1* | 11/2016 | Yi | H04L 5/0046 |

* cited by examiner

*Primary Examiner* — Omar J Ghowrwal
(74) *Attorney, Agent, or Firm* — Patent Portfolio Builders, PLLC

(57) ABSTRACT

The invention refers to a resource scheduling for a radio channel between a radio telecommunications network and a radio terminal or user equipment, UE, wherein the radio telecommunications network performs a resource scheduling in dependency of a reported channel quality of the radio channel, wherein the UE performs the steps of determining (52) a channel quality with respect to the radio channel, determining (53) a communication type with respect to the radio channel, generating (55, 56) a channel quality value as a function of the channel quality and the communication type, and transmitting the channel quality value to the radio telecommunications network. The invention further refers to a radio terminal and a computer program for performing the method.

14 Claims, 4 Drawing Sheets

| CQI index | modulation | code rate x 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Fig. 4a

| CQI index | modulation | code rate x 1024 | efficiency |
|---|---|---|---|
| 0 | out of range | | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

Fig. 4b

CHANNEL QUALITY REPORTING IN DEPENDENCY OF COMMUNICATION CONDITIONS

TECHNICAL FIELD

The present invention generally relates to resource scheduling in a mobile radio communications network.

BACKGROUND

In advanced radio telecommunication networks, a resource scheduling adaptation with respect to a connected radio communication device or user equipment, UE, is performed based on feedback information received from the UE.

As an example, according to 3GPP, Technical Specification 36.213, version 12.3.0, in the following being referred to as TS 36.213, the UE shall perform a periodic and/or an aperiodic reporting of indicators comprising a channel quality indicator, CQI, and a rank indicator, RI, to inform the radio access network node about the UE's radio conditions. This information may be used by the radio access network for scheduling decisions (e.g. comprising a selection of a modulation and coding scheme, MCS, to be used by the UE for receiving or transmitting a certain transport block, and a resource block, RB, allocation to the UE) to ensure an efficient usage of radio resources.

According to present paradigms, the network will usually perform a scheduling to ensure a maximum data throughout given the current channel conditions and UE capabilities. Thereto, as e.g. defined in section 7.2.3 of TS 36.213, the UE shall report to the radio terminating node of radio access network, i.e. the eNB, the highest wideband CQI value within the range of suitable CQI values matching to the instantaneous radio conditions experienced by the UE given the receiver capabilities of the UE, resulting into a block error rate, BLER, equal or below 10%. The BLER therein may represent a ratio of a number of erroneous data blocks and a corresponding total number of received data blocks. The radio access network will use the reported CQI value as one input to its scheduling algorithm. As defined in above-cited TS 36.213, there are 15 CQI values from 0 to 15 each associated to a certain efficiency, wherein the efficiently increases with the value.

Reporting such "maximum" CQI value may result in high or aggressive MCS and RB allocation with high code rates by the eNodeB. In certain conditions however, such resource allocation may result in a high BLER beyond the defined maximum BLER, especially in situations of frequency selective fading channels, where the channel in frequency domain has large variance. As a consequence, a single downlink (DL) transport block (TB) might be sent with too high allocation and some or even all HARQ retransmissions might fail.

In case of a short duration signaling connection, the connection may be released before the signaling data from the UE may be successfully received by the network. Such behavior may have a high impact on the system performance.

As an example, according to 3GPP TS 24.301, version 12.6.0, several scenarios are defined, wherein a UE shall perform a tracking area update, TAU procedure. In some scenarios, e.g. in a scenario as shown in FIG. 1, a radio connection is established just to perform TAU procedure, e.g. when a UE 10 enters into a new tracking area if no user data is pending.

Thereto, the UE 10 may send an evolved packet system (EPS) Mobility Management (EMM) TAU REQUEST message S1 with old context (e.g. a Globally Unique Temporary ID, GUTI, according to LTE specifications, allocated by a previous mobility management entity (MME) to the UE 10) to a base station or eNodeB 11 that forwards this message to an (actual) MME. After performing an RRC connection setup communication S2 with the base station 11, and an EMM authentication communication S3, and an EMM security communication S4 with the MME, The MME sends a TRACKING AREA UPDATE COMPLETE message S5 with new context (over the eNodeB 11) to the UE 10. The UE 10 sends a TAU COMPLETE message S6 to the eNodeB 11, and the eNodeB 11 replies with a RLC status report S7 to acknowledge reception of TAU COMPLETE message and a RRC CONNECTION RELEASE message S8 to release the LTE connection.

The UE non-access stratum, NAS, layer within the UE 10 must know if the TAU COMPLETE message has been received correctly by the network. The UE 10 may derive this information from a reception of the RLC status report (RLC ACK) for the UL transmission of the TAU COMPLETE message. If, as consequence of too high allocation, the transport block containing this RLC status report cannot be received/decoded correctly by UE 10 as depicted in FIG. 1, the UE cannot judge if the previous transmission of the TAU COMPLETE message was successfully received by the network. With the reception of the RRC CONNECTION RELEASE message S8 there is also no possibility to request a new RLC status report. The UE will repeat the TAU procedure by re-sending a TAU Request with old context S9 which will however be rejected by the network that correspondingly sends a TAU REJECT message S11 and a further RRC CONNECTION RELEASE message S12 to the UE 10. As a consequence, a time and resource consuming a re-attach procedure is required.

SUMMARY

It is an object of the present invention to provide an alternative channel quality feedback suitable for short duration signaling communication.

This object is achieved by the independent claims. Advantageous embodiments are described in the dependent claims and by the following description.

Advanced radio networks perform a resource scheduling based on a radio channel quality feedback sent by a radio terminal, also being referred to as user equipment, UE, to the network. According to embodiments of the invention, the UE applies a selective channel quality determination dependent on a communication condition of the radio channel between the UE and the network.

According to an embodiment, the UE measures a channel quality, determines the communication condition with respect to the radio channel, and determines a channel quality value to be reported to the radio network as a function of the measured channel quality and the communication condition. The channel quality value may be indicated by means of an index value inserted into a channel quality report that is transmitted to the radio network.

An appropriate node of the radio telecommunications network, e.g. a base station or an eNodeB of an evolved universal radio access network, E-UTRAN, within the network may perform a resource scheduling with respect to the UE based on the channel quality value.

In an embodiment, the channel quality value is selected out from a set of defined values. The UE may report an indication out of a set of indications, wherein each indication is associated to one value. The reporting of the channel quality value indicator may be performed according to above-cited 3GPP TS 36.213. Therein, the UE may perform a periodic and/or an aperiodic reporting of said indicator.

In an embodiment, the communication condition to be detected is a function of whether the communication is a signaling communication only or whether the communication comprises payload communication. A first condition may be associated a signaling-only communication, wherein only signaling information is transmitted between the UE and the network (and wherein no user data transmission is pending). A second condition may be associated to a communication comprising payload data wherein payload data (e.g. data being delivered to/from an application of the UE) is transmitted to and/or from the UE (and/or with user data transmission pending).

In a further embodiment, the duration of a communication may be a criterion to distinguish between different types. Therein, the communication type may be determined regarding a predictable duration of an ongoing communication. A first type of connection may be a short duration connection, e.g. a signaling sequence having a predicable (short term) end, and a second type of connection may be any other connection, e.g. any connection without a predictable (short term) end.

The present invention also concerns computer programs comprising portions of software codes in order to implement the method as described above when operated by a respective processing unit of a radio terminal or user equipment e.g. a user equipment according to 3GPP LTE specifications. The computer program may be stored on a computer readable medium. The computer-readable medium can be a permanent or rewritable memory within the user equipment, or located externally. The respective computer program may be also transferred to the user equipment for example via a cable or a wireless link as a sequence of signals.

In the following, detailed embodiments of the present invention shall be described in order to give the skilled person a full and complete understanding. However, these embodiments are illustrative and not intended to be limiting.

BRIEF DESCRIPTION OF THE FIGURES

FIGS. 4a, 4b show CQI value tables defined in above-cited 3GPP specification TS 36.213.

DETAILED DESCRIPTION

Feedback information from the UEs to the radio access network is an important element of advanced radio communication networks and has significant impact on the system performance. In LTE, three different quality/capability indicators, namely a Channel Quality Indicator, CQI, Pre-coding Matrix Indicator, PMI, and a Rank Indicator, RI, are fed back from the UE to the radio access network. These three values are computed or determined in the UE and fed back to the radio access network according to certain schemes. Based on these indicators the radio access network controls resource allocation among the various UEs that are requesting service.

CQI Reporting may be performed periodically and/or on an aperiodic base. The granularity of CQI report can be divided into three levels: wideband CQI, UE selected subband CQI, and higher layer configured CQI. Wideband CQI provides channel quality information for the entire downlink system bandwidth of the cell. UE selected subband CQI refers to a channel quality within a subband selected by the UE. Higher layer configured CQI is used in aperiodic reporting.

As discussed in the introductory part, Thereto, according to TS 36.213, the UE shall report to the eNB, the highest wideband CQI value within the range of suitable CQI values matching to the instantaneous radio conditions experienced by the UE given the receiver capabilities of the UE, resulting into a block error rate, BLER, equal or below 10%.

FIG. 4a and FIG. 4b each show a table defined in above-cited TS 36.213, Table 7.2.3-1 and 7.2.3-2 respectively. Each table comprises a list of 16 CQI values from 0 to 15 each associated to a certain efficiency, wherein the code rate and hence the efficiently increases with the value.

Figure 1:
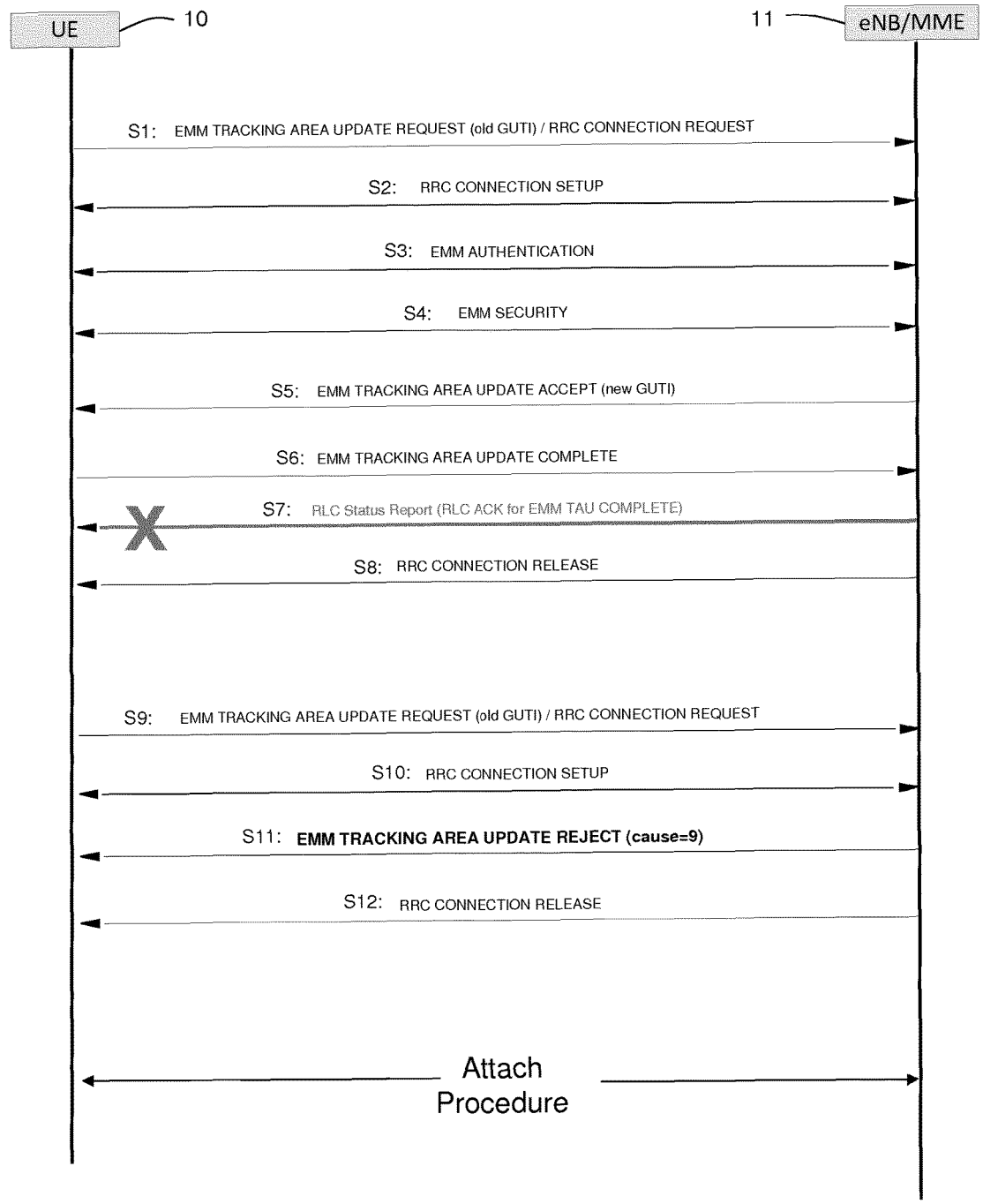
FIG. 1 shows a sequence diagram depicting a tracking area update procedure according to existing 3GPP specifications.
Figure 2:
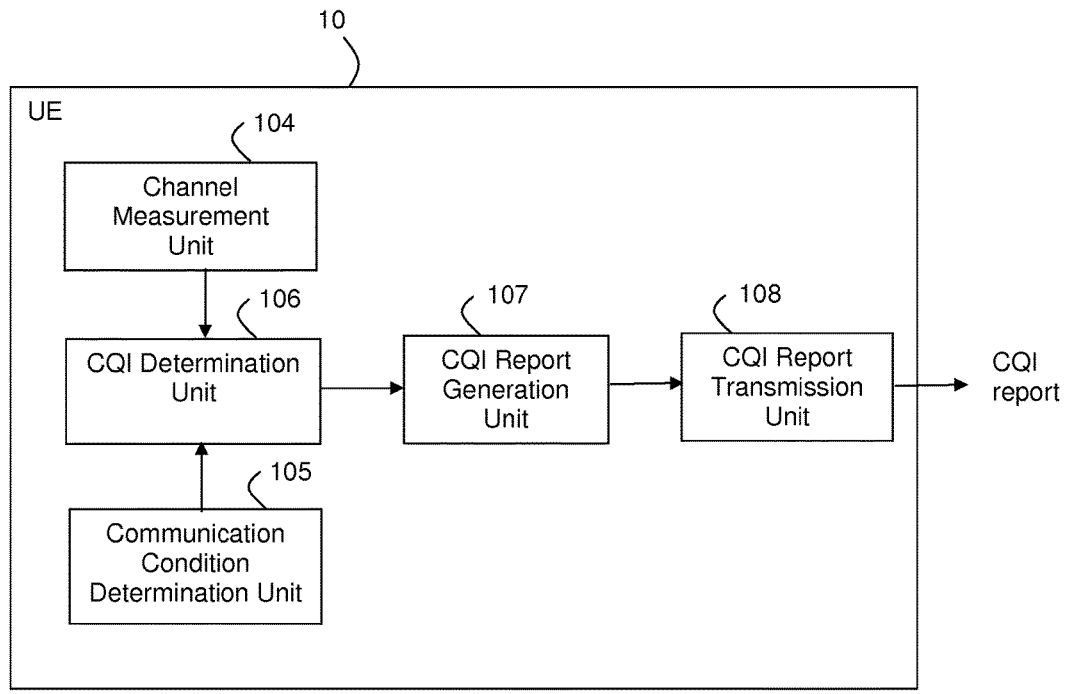
FIG. 2 shows a principal block diagram depicting exemplary functional units of a user equipment to perform a channel quality feedback according to the invention.

FIG. 2 shows a block diagram illustrating functional blocks or units of an exemplary radio terminal or user equipment, UE 10. The UE 10 comprises a channel measurement unit 104, a communication condition or type determination unit 105, a CQI determination unit 106, a CQI report generation or determining unit 107 and a CQI transmission unit 108.

The channel measurement unit 104 performs a channel quality measurement within a certain observation interval in time and frequency. The communication type determination unit 105 determines communication condition indicative of a type of communication that shall be performed. The CQI determination unit 106 determines a CQI value as a function of the channel quality measurement and the communication condition. The CQI report generation unit 107 generates a CQI report message to be transmitted to the network by the CQI transmission unit 108

Thereto, the channel measurement unit 104 performs a channel quality measurement within a certain observation interval in time and within a given frequency, e.g. over the whole wide band frequency range.

The communication condition determination unit 105 determines if the ongoing communication is a signalling only communication or if user communication (comprising transmission of payload data) is involved. Alternatively, the determination unit 105 may determine if the communication is a short term communication or not. Specifically, the determination unit 105 may determine, if amongst the radio bearer involved in the communication, only so-called signalling radio bearers are or will be established.

According to 3GPP TS 36.331, current version 11.0.0, section 4.2.2, signalling radio bearers (SRBs) are defined as radio bearers (RB) that are used only for the transmission of radio resource control, RRC, and non-access stratum, NAS, messages. More specifically, the following three SRBs are defined:

SRB0 for RRC messages using the CCCH logical channel (Common Control Channel);

SRB1 for RRC messages (which may include a piggy-backed NAS message) as well as for NAS messages prior to the establishment of SRB2, all using DCCH logical channel (Dedicated Control Channel);

SRB2 for NAS messages, using DCCH logical channel (SRB2 has a lower-priority than SRB1 and is configured by E-UTRAN after security activation).

Differently, the so-called data radio bearers (DRBs) are used to carry user data traffic (e.g. IP packets).

Accordingly, the determination unit 105 may determine if the one or the plurality of bearers involved in the communication comprises only one or a plurality out of the bearers SRB0, SRB and SRB2, or if at least one data radio bearer is comprised. Further the determination unit 105 may determine if a user data transmission is pending.

By way of example, in case of a communication involving user data transmission and/or of a pending user data transmission a type 1 condition will be determined, whereas in case of a signaling only communication with not pending user data transmission a type 2 condition will be determined.

The CQI determination unit 106 determines a CQI value as a function of the channel quality measurement and the type of condition. In an embodiment, the CQI value is determined as follows:

In cases of type 1 condition, a first (or normal) CQI value is selected out of the range of CQI values. Otherwise, in case of type 2 condition, a second (or robust) CQI value is selected, wherein the second CQI value is lower than the first CQI value. The first CQI value is thus associated to a more "aggressive" resource scheduling compared to second CQI value.

Specifically, the CQI determination unit 106 selects one out of the CQI index values between 0 and 15, e.g. from one of the tables in FIG. 4a or 4b matching to the instantaneous radio conditions experienced by the UE given the receiver capabilities of the UE, resulting into a block error rate, BLER, equal or below 10%.

Further specifically, as specified in afore-cited 3GPP TS 36.213, the CQI index may be selected to satisfy the following condition or CQI index 0 if CQI index 1 does not satisfy the following condition:

A single PDSCH (Physical Downlink Shared Channel) transport block with a combination of modulation scheme and transport block size corresponding to the CQI index, and occupying a group of downlink physical resource blocks (as termed the CSI (channel state information) reference resource), could be received with a transport block error probability not exceeding 0.1.

In cases of type 1 condition, the CQI determination unit 106 forwards comprising the determined CQI value ("aggressive" CQI index value) to the CQI report generation unit 107. In case of type 2 condition the CQI determination unit 106 subtracts a certain value, e.g. 1, 2 or 3 from the determined CQI value and forward the thus modified CQI index value ("less aggressive" or "robust" CQI index value) to CQI report generation unit 107.

Thus, the robust CQI index value may be regarded as modified CQI index value, and the aggressive CQI index value as non-modified or normal CQI value (i.e. the CQI value expected in view of the instantaneous channel conditions).

The aggressive CQI index may cause the access network to perform a resource allocation to maximise an overall data throughput (taking into account that the data receiver of the UE 10 will fail from time to time to correctly decode data packets). The robust CQI index may cause the access network to perform a resource allocation to ensure a safe communication (taking into account a lower data throughput) that minimizes or even avoids re-transmissions.

Figure 3:
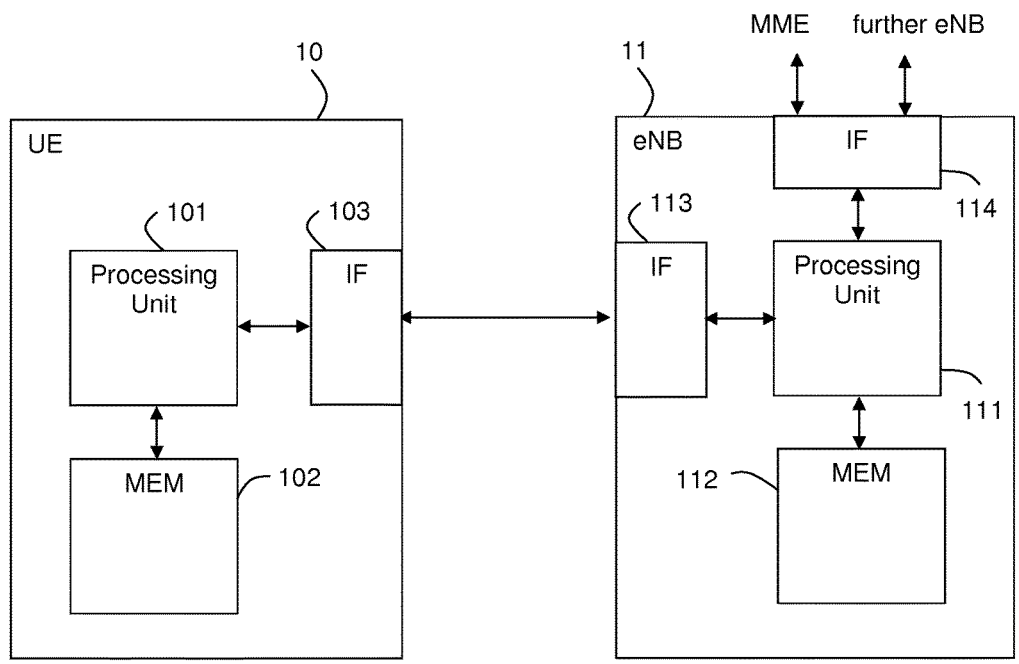
FIG. 3 shows a block diagram depicting the user equipment of FIG. 2 and a base station realized as computer nodes.

FIG. 3 is a block diagram illustrating elements of the user equipment UE 10 of FIG. 2. FIG. 3 further illustrates elements of a base station 11 communicating with the UE 10. As shown, the UE 10 may include a transceiver or interface circuit 103 (also referred to as a transceiver) configured to provide radio communications with the base station 11, a processor circuit 101 (also referred to as a processor) coupled to the transceiver circuit, and a memory circuit (also referred to as a memory) 102 coupled to the processor circuit 101. The memory 102 may include computer readable program code that when executed by the processor circuit 101 causes the processor to perform UE operations according to embodiments disclosed herein. According to other embodiments, the processor 101 may be defined to include memory so that the memory 102 may not be separately provided.

The base station 11 may include a first interface or transceiver circuit 113 (also referred to as a transceiver) configured to provide radio communications with a plurality of UEs, and the second interface or network interface circuit 114 (also referred to as a network interface) configured to provide communications with other base stations of the RAN (e.g. over the X2 interface) and a mobility management entity, MME (e.g. over the S1-MME interface), and a processor circuit 111 (also referred to as a processor) coupled to the transceiver circuit 113 and the network interface circuit 114, and a memory circuit 112 (also referred to as a memory) coupled to the processor 111. The memory 112 may include computer readable program code that when executed by the processor 111 causes the processor circuit to perform base station operations.

The computer readable program may be downloaded entirely or in parts from a computer-readable medium into the memory of the UE or the base station respectively. The computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BLUE-RAY DISC).

The base station 11 may support any 3GPP technology, e.g. based on one or a plurality of: GSM/EDGE, WCDMA/HSPA, and LTE such as provided by the so-called RBS 6000 family of the applicant. The following description will focus on LTE; consequently the radio base station RBS 11 will be referred to as evolved Node B or eNodeB 11 according to above-cited LTE standards.

The MME may be involved in the communication between the UE 10 and the network, e.g. in the TAU procedure as described in the introductory section. The MME is a signalling-only entity to manage the mobility of the UE 10, with respect to the radio access network, to support means of personal, service and terminal mobility, and to support global roaming independent of the underlying wireless technology. In addition, the MME may perform authentication and authorization, idle-mode tracking and reachability, security negotiations, and in bearers activation/deactivation process.

Figure 5:
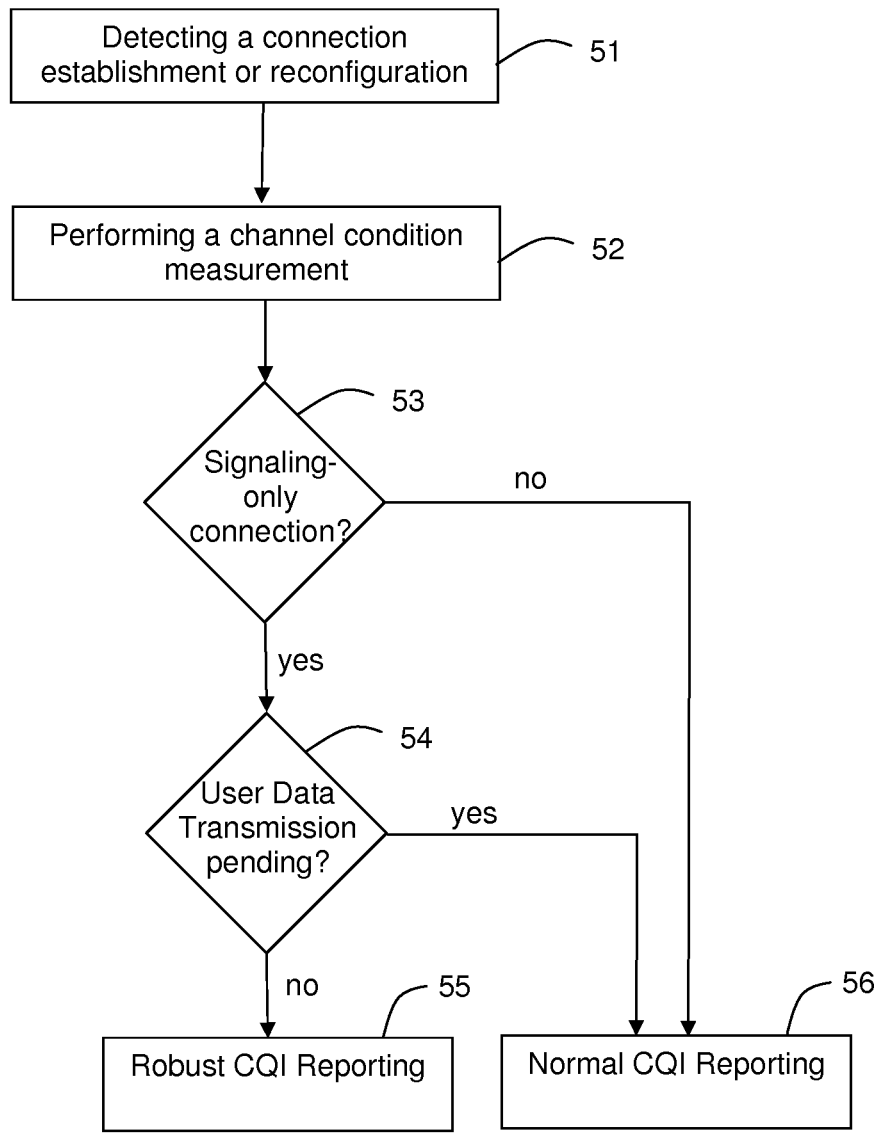
FIG. 5a shows a flow chart illustrating an exemplary method for performing the channel quality feedback in the user equipment according to FIG. 2 or FIG. 3.

FIG. 5 shows an exemplary flow chart illustrating exemplary steps for performing a CQI reporting according to embodiments of the invention.

In a first step 51, the CQI reporting is triggered e.g. by a (RRC) connection establishment or a reconfiguration.

In a second step 52, the UE performs a measurement of instantaneous radio channel conditions, e.g. as expected according to afore-mentioned 3GPP standards.

In a third step 53, it is determined if the connection between the UE 10 and the eNodeB 11 as shown in previous figures is a signalling-only connection (e.g. if only radio bearers are being established). If yes, following fourth step 54 is performed. If no, alternative sixth step 56 is performed.

In the fourth step 54, it is determined, if a user data transmission is pending. If no the following fifth step 55 is performed. If yes, alternative sixth step 56 is performed.

In the fifth step 55, a robust CQI index value is determined that is lower than the normal CQI index value as described above. As described above, the robust CQI value may be derived by subtracting a certain number (=modifying value) from the normal CQI index value:

If Normal CQI index value−modifying value>1,

Robust CQI index value=Normal CQI index value− modifying value

Otherwise Robust CQI index value=1

The CQI report to be sent to the eNodeB 11 comprises the Robust CQI index value.

In the alternative step 56, a normal CQI index value is determined according to the channel conditions (as expected according to above-cited 3GPP standards). The CQI report to be sent to the eNodeB 11 comprises the normal CQI index value.

In the scenario as described in the introductory section, the UE enters into a new tracking area (with no user data pending). A radio connection is established just to perform TAU procedure. According to above-described embodiments the UE 10 detects or determines that only signaling bearers are involved in the corresponding communication between the UE 10 and the eNodeB 11 of the access network and thus reports a modified CQI index value to the eNodeB 11 that is lower than the CQI value expected in view of the instantaneous channel conditions. At the end of TAU procedure, the UE sends a TAU COMPLETE message to the eNodeB, and the eNodeB replies with a RLC status report to acknowledge reception of TAU COMPLETE message and a RRC CONNECTION RELEASE message to release the LTE connection. In order to determine whether the TAU COMPLETE message has been correctly received by the network, the UE evaluated the corresponding RLC status report (RLC ACK) for the UL transmission of the TAU COMPLETE message.

As the eNodeB 11 has received the robust CQI value from the UE 10, the eNodeB 11 will schedule lower resources with higher redundancy so that the chances to properly decode all download transport blocks increase. Hence, the transport block containing this RLC status report is being transmitted with less aggressive resource allocation, so that the risk that this RLC status report cannot be received by UE is reduced. Therewith, unsuccessful TAU procedures may be avoided and thus time and resource consuming re-attach procedures in the context of such procedures may be avoided at least to certain extend.

This may mitigate temporary weaker radio conditions and/or situation where the network may not yet have enough information to apply outer loop link adaptation.

The UE 10 may apply above-described procedures further based on certain channel condition parameters, e.g. small delay spreads and/or low Doppler estimates to reflect that reporting and instantaneous channel in time and/or frequency can show huge differences to wideband reports even if the report would not be that aggressive.

The invention claimed is:

1. A method of resource scheduling for a radio channel between a radio telecommunications network and a user equipment (UE), wherein the radio telecommunications network performs a resource scheduling in dependency of a reported channel quality value indicative of a quality of the radio channel, the method being performed by the UE and comprising:

determining a channel quality with respect to the radio channel;

determining a communication condition based on a type of one or more radio bearers established with respect to the radio channel;

generating a channel quality value as a function of the channel quality and the communication condition; and transmitting the channel quality value to the radio telecommunications network, wherein the channel quality value is selected from a list comprising a certain number of index values, wherein generating the channel quality value comprises:

selecting a first index value out of the list to be reported as channel quality value in response to detecting a first communication condition, and selecting a second index value out of the list to be reported as channel quality value in response to detecting a second communication condition, the first index value being different from the second index value, and wherein the channel quality value associated with the second communication condition is determined by subtracting a predetermined value V from the channel quality value associated with the first communication condition.

2. The method of claim 1, wherein the communication condition is determined depending further on whether a user data transmission between the UE and the radio telecommunications network is pending or not.

3. The method of claim 1, wherein a code rate to be scheduled by the radio telecommunications network is dependent on the index value such that with an increasing index value, the code rate to be scheduled increases.

4. The method of claim 1, wherein the first communication condition is associated with a communication comprising a transmission of user data; and wherein the second communication condition is associated with a signaling-only communication.

5. The method of claim 4, wherein the channel quality value associated with the first communication condition is selected such that a code rate to be scheduled matches the instantaneous radio conditions experienced by the UE resulting into a predetermined block error rate.

6. The method of claim 1, wherein the predetermined value V is chosen from the numbers in the range 0<V<15.

7. A non-transitory computer readable recording medium storing a computer program product for resource scheduling for a radio channel between a radio telecommunications network and a user equipment (UE), wherein the radio telecommunications network performs a resource scheduling in dependency of a reported channel quality value indicative of a quality of the radio channel, the computer program product comprising software instructions which, when run on processing circuitry of the UE, causes the UE to:

determine a channel quality with respect to the radio channel;

determine a communication condition based on a type of one or more radio bearers established with respect to the radio channel;

generate a channel quality value as a function of the channel quality and the communication condition; and transmit the channel quality value to the radio telecommunications network, wherein the channel quality value is selected from a list comprising a certain number of index values, wherein generation of the channel quality value comprises:

selecting a first index value out of the list to be reported as channel quality value in response to detecting a first communication condition, and selecting a second index value out of the list to be reported as channel quality value in response to detecting a second communication condition, the first index value being different from the second index value, and wherein the channel quality value associated with the second communication condition is determined by subtracting a predetermined value V from the channel quality value associated with the first communication condition.

8. A user terminal (UE) for supporting a radio resource scheduling performed in dependency of a reported channel quality value, the UE comprising:

a transceiver;

processing circuitry; and memory containing instructions executable by the processing circuitry, whereby the UE is operative to:

determine a channel quality with respect to a radio channel towards a radio telecommunications network;

determine a communication condition based on a type of one or more radio bearers established with respect to the radio channel;

generate a channel quality value as a function of the channel quality and the communication condition; and transmit the channel quality value to the radio telecommunications network, wherein the instructions are such that the UE is further operative to:

select the channel quality value from a list comprising a certain number of index values, select a first index value out of the list to be reported as channel quality value in response to detecting a first communication condition, and select a second index value out of the list to be reported as channel quality value in response to detecting a second communication condition, the first index value being different from the second index value, and wherein a code rate to be scheduled by the radio telecommunications network is dependent on the index value such that with an increasing index value, the code rate to be scheduled increases.

9. The UE of claim 8, wherein the instructions are such that the UE is further operative to generate the communication condition further based on whether a user data transmission between the UE and the radio telecommunications network is pending or not.

10. The UE of claim 8, wherein the first communication condition is associated with a user data communication; and wherein the second communication condition is associated with a signaling-only communication.

11. The UE of claim 8, wherein the first communication condition is associated with a situation after a detection of a connection establishment or reconfiguration wherein user data transmission is pending and/or user data is to be transmitted; and wherein the second communication condition is associated with a signaling-only communication with no pending user data transmission.

12. The UE of claim 10, wherein the instructions are such that the UE is further operative to determine the channel quality value associated with the first communication condition such that the code rate to be scheduled by the radio telecommunications network matches the instantaneous radio conditions experienced by the UE resulting into a predetermined block error rate.

13. The UE of claim 10, wherein the instructions are such that the UE is further operative to determine the channel quality value associated with the second communication condition by subtracting a predetermined value V from the channel quality value associated with the first communication condition.

14. The UE of claim 13, wherein the predetermined value V is in the range $0<V<15$.

* * * * *